United States Patent
Doll et al.

(10) Patent No.: US 8,050,816 B2
(45) Date of Patent: Nov. 1, 2011

(54) PERIODIC RATE SENSOR SELF TEST

(75) Inventors: Kenneth A. Doll, Ann Arbor, MI (US); Arnold H. Spieker, Commerce Township, MI (US)

(73) Assignee: Kelsey-Hayes Company, Livonia, MI (US)

( * ) Notice: Subject to any disclaimer, the term of this patent is extended or adjusted under 35 U.S.C. 154(b) by 366 days.

(21) Appl. No.: 12/085,605

(22) PCT Filed: Nov. 30, 2006

(86) PCT No.: PCT/US2006/045821
§ 371 (c)(1),
(2), (4) Date: Apr. 7, 2009

(87) PCT Pub. No.: WO2007/064782
PCT Pub. Date: Jun. 7, 2007

(65) Prior Publication Data
US 2009/0277244 A1    Nov. 12, 2009

(51) Int. Cl.
*G06F 19/24* (2011.01)

(52) U.S. Cl. .......................................................... 701/34
(58) Field of Classification Search ..................... 701/34
See application file for complete search history.

(56) References Cited

U.S. PATENT DOCUMENTS

| | | | | |
|---|---|---|---|---|
| 5,406,329 A * | 4/1995 | Kashimura et al. | ........... | 348/175 |
| 5,621,167 A * | 4/1997 | Fang-Cheng | .............. | 73/114.74 |
| 6,298,709 B1 | 10/2001 | Artzner et al. | | |
| 6,651,205 B2 * | 11/2003 | Takahashi | ...................... | 714/738 |
| 6,792,792 B2 | 9/2004 | Babala | | |
| 6,843,537 B2 | 1/2005 | Babla et al. | | |
| 6,934,665 B2 * | 8/2005 | Rober | ........................... | 702/189 |
| 7,243,278 B2 * | 7/2007 | Arkin | .............................. | 714/724 |
| 2005/0167960 A1 * | 8/2005 | Tanaka et al. | ................. | 280/735 |

* cited by examiner

*Primary Examiner* — Paul N Dickson
*Assistant Examiner* — Nicole Verley
(74) *Attorney, Agent, or Firm* — MacMillan, Sobanski & Todd, LLC

(57) ABSTRACT

A periodic test signal (44) is injected into a sensor and the sensor output (46) is compared to a threshold to determined whether the sensor is functioning properly.

14 Claims, 6 Drawing Sheets

PERIODIC RATE SENSOR SELF TEST

BACKGROUND OF THE INVENTION

This invention relates in general to sensors and in particular to a method for testing the operation of sensors.

Vehicle control systems utilize a variety of sensors that monitor vehicle operational parameters. Additionally, vehicle electronically controlled brake systems are becoming increasing sophisticated to include the capability to correct vehicle directional movement upon detection of an undesired vehicle motion, such as, for example, loss of directional control on a low mu surface or potential vehicle roll over. Such detection typically involves motion sensors, to include accelerometers and/or angular rate sensors and also usually includes input from other vehicle operating parameter sensors, such as, for example, wheel speed sensors and a steering angle sensor. Vehicle brake control systems typically include an Electronic Control Unit (ECU) that receives the various sensor output signals. A microprocessor within the ECU that is controlled by a stored algorithm monitors the received sensor signals. The microprocessor is operative, upon detection of a potential vehicle directional stability problem, to selectively apply the vehicle brakes and/or vary engine torque to correct the problem.

The motion sensors utilized by the brake control system are also becoming increasingly miniaturized and sophisticated to include signal conditioning circuits. Multiple motion sensors with associated signal conditioning circuits for the sensor outputs may be included on a single sensor chip. The signal conditioning circuits also may include a self testing capacity for monitoring the sensor output signal to detect a malfunctioning sensor. Typically, the self test is carried out during initial vehicle start-up and will generate an error code if the signal conditioning circuit determines that the sensor output signal exceeds a predetermined threshold. Also, upon detecting a malfunctioning sensor, the self test capability may disable the sensor output so an erroneous signal is not sent to the ECU.

However, because vehicles are operated for increasingly lengthy periods of time, limiting self-testing to initial vehicle start-up has effectively increased the operational time of motion sensors between self tests. As a result, if motion sensors begin to malfunction during vehicle operation, the problem may not be detected in a timely fashion. Accordingly, it would be desirable to provide a periodic self test method for the motion sensors that would occur while the vehicle is in operation. Such testing would also be desirable for other sensors utilized by a motor vehicle.

BRIEF SUMMARY OF THE INVENTION

This invention relates to a method for testing the operation of sensors.

The present invention contemplates a method for verifying proper operation of sensor that includes providing a sensor adapted to generate a sensor signal that is representative of a sensed vehicle operating parameter and generating a sampled sensor output signal from the sensor signal. A test signal is then provided to the sensor after a first one of two consecutive sampled output signals to induce a test output signal before the occurrence of the second of the two consecutive sampled output signals. The test output signal is monitored and compared to a test criteria The invention also may include a step of generating an error signal upon the test signal induced output signal not meeting the test criteria. Additionally, the error signal may comprise setting a fault flag. Furthermore, the invention also contemplates that the error signal may be generated only after the test signal induced output signal has not met the test criteria for a predetermined number of times.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
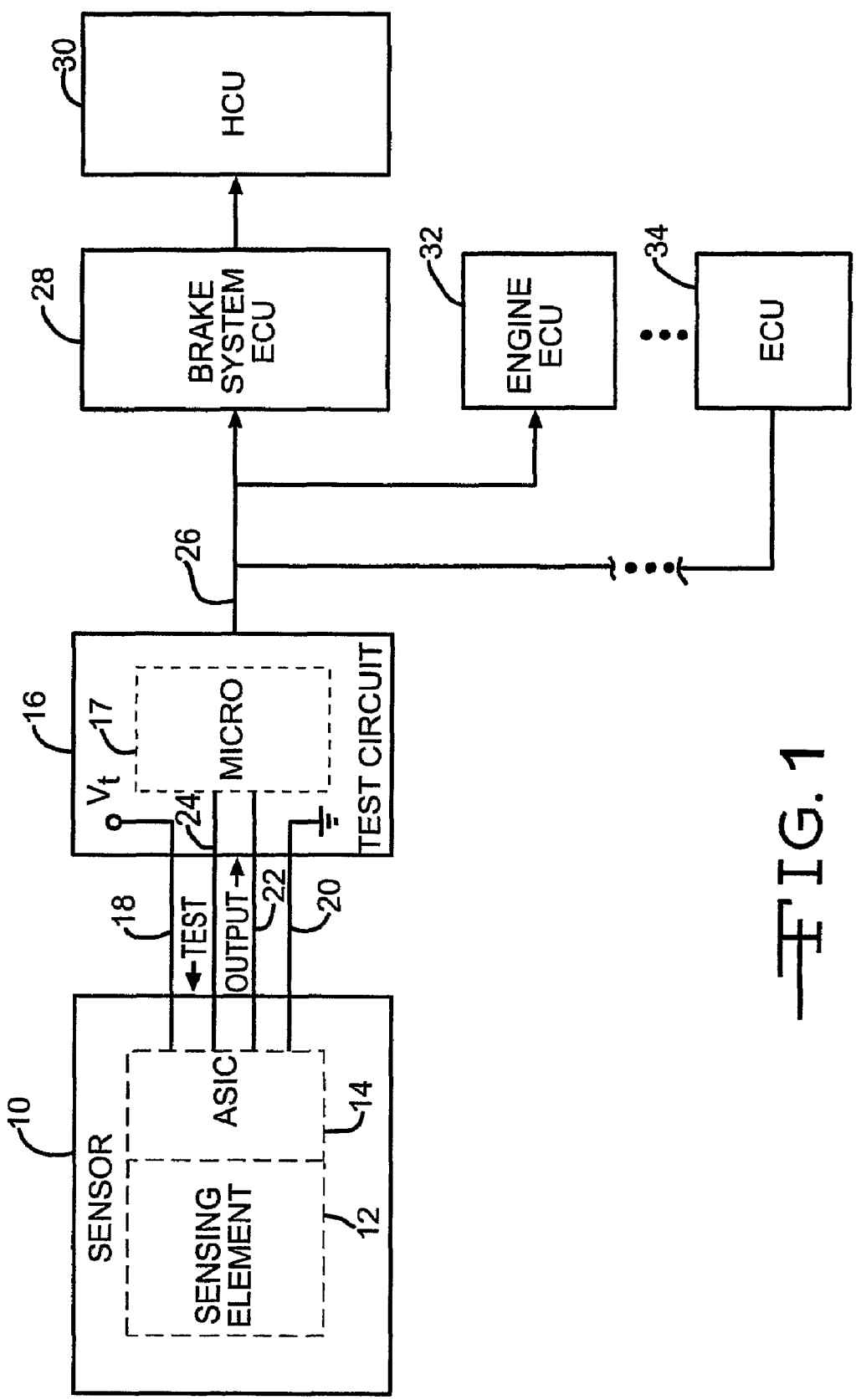
FIG. 1 is a schematic diagram of a sensor in accordance with the present invention.

Referring now to the drawings, there is illustrated in FIG. 1 a schematic diagram for a typical sensor 10 used to monitor operating parameters of a motor vehicle. As shown in the Figure, the sensor includes a sensing element 12 and an Application Specific Integrated Circuit (ASIC) 14 that conditions the signal generated by the sensing element 12. The sensing element 12 is selected to monitor a particular vehicle operational parameter such as, for example, acceleration, rotational velocity or yaw, displacement or force. The ASIC 14 is connected to a test circuit 16 that includes a microprocessor 17 with an associated algorithm, as described below, for testing the sensor 10 while the vehicle is operating. As shown, the sensor 10 is connected to the test circuit 16 by four lines. A first line 18 is connected to a voltage supply and provides power to the sensor 10 while a second line 20 is a ground connection. A third line 22 connects the output of the sensor 10 to the test circuit and carries an output signal generated by the sensor 10 from the sensor to the test circuit 16. The fourth line 24 is a test line and carries a test signal from the test circuit 16 to the sensor 10. While the test circuit 16 is shown as a separate component in FIG. 1, it will be appreciated that the invention also may be practiced with the test circuit 16 integrated into the sensor 10 (not shown). Likewise, the ASIC 14 may be located remotely from the sensing element 12 (not shown).

As also shown in FIG. 1, the test circuit 16 is connected by a Controller Area Network (CAN) bus 26 to a brake system Electronic Control Unit (ECU) 28. The ECU 28 includes electronic components for controlling the operation of a vehicle brake system by selective operation of a plurality of solenoid valves mounted upon a Hydraulic Control Unit (HCU) 30. The test circuit 16 also may be connected to other vehicle ECU's, such as, for example an engine ECU 32 for controlling the vehicle engine, an active suspension control ECU, and any number of other control system ECU's 34. Such multiple connections to ECU's are efficiently provided by the use of the CAN bus 26; however, the invention also may be practiced with hard wiring provided from the test circuit 16 to each ECU that utilizes the sensor output data (not shown).

Figure 2:
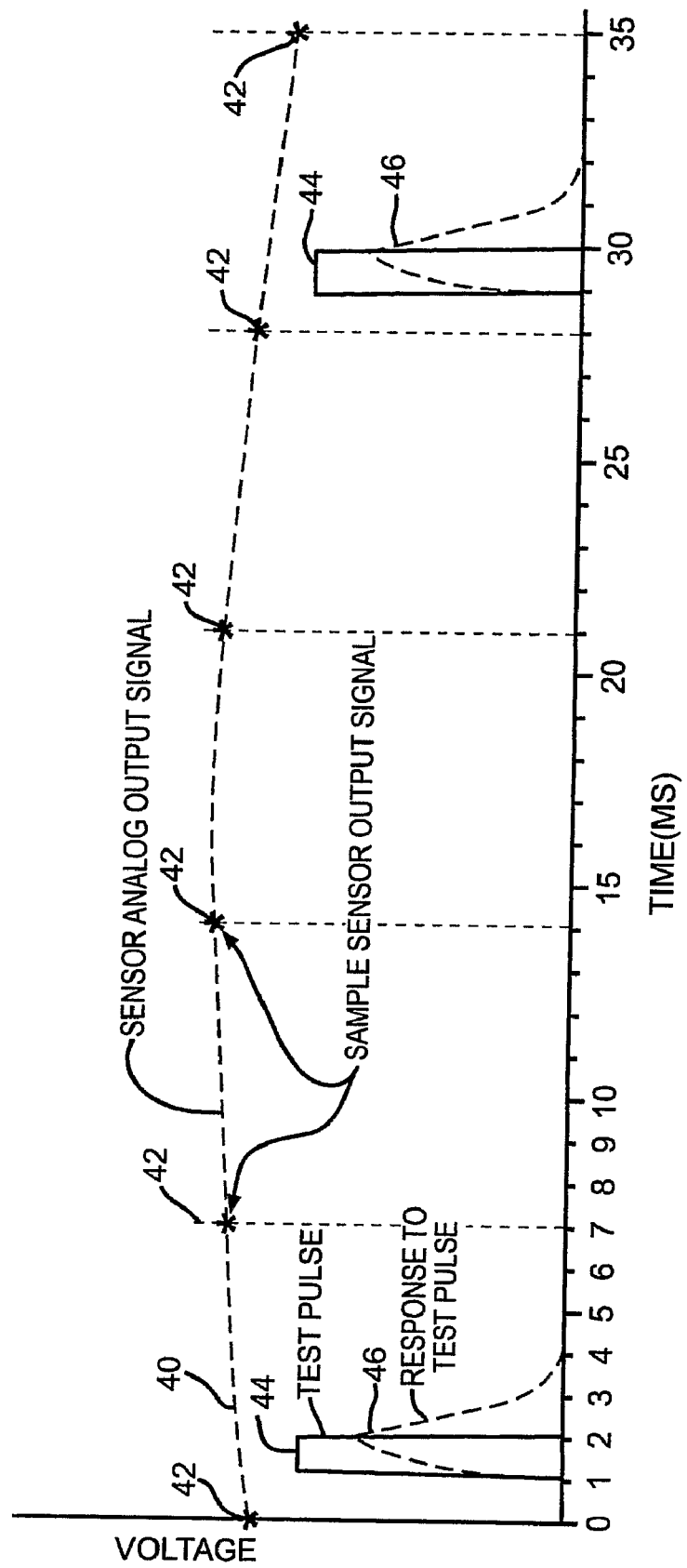
FIG. 2 is a graph illustrating the operation of the sensor shown in FIG. 1.

The operation of the test circuit 16 is illustrated by the graph shown in FIG. 2. In the preferred embodiment, the sensor element 12 generates an analog signal that is amplified and filtered by the ASIC 14 to generate a conditioned sensor analog signal that is shown by the dashed line labeled 40 in FIG. 2. Additionally, the ASIC 14 samples the conditioned sensor signal 40 to generate a sampled signal represented by the values labeled 42 that are then transmitted over the output signal line 22 to the test circuit 16. While an instantaneous value is shown for the sampled output signal 42, the output may also be an averaged value of the analog signal 40 that is taken over the period between sampling points (not shown) and generated by the ASIC 14. While FIG. 2 illustrates the output signal 42 being generated at 7 millisecond intervals, other sampling times also may be utilized. The test circuit 16 forwards the sampled sensor output signal over the CAN 16 to selected vehicle control system ECU's.

The present invention contemplates that the test circuit 16 injects a test voltage pulse 44 into the sensor 10 over the test line 24 between output signal sampling intervals over the test signal line 24. In the preferred embodiment, the test pulse 44 is one millisecond in duration; however, test pulses having other durations also may be used. The test pulse generates a response that is shown by dashed waveform labeled 46 in FIG. 2. The test pulse response 46 is sent over the output signal line 22 to the test circuit 16. In the test circuit 16, the test pulse response 46 is compared to a test criteria, such as, for example, a predetermined threshold, to determine whether the sensor is 10 is functioning properly. If the test circuit 16 determines that the sensor is faulty, an error signal is generated that is sent over the CAN bus 26 to the ECU's. The error signal may consist of a changed voltage level or the setting of an error flag.

Figure 3:
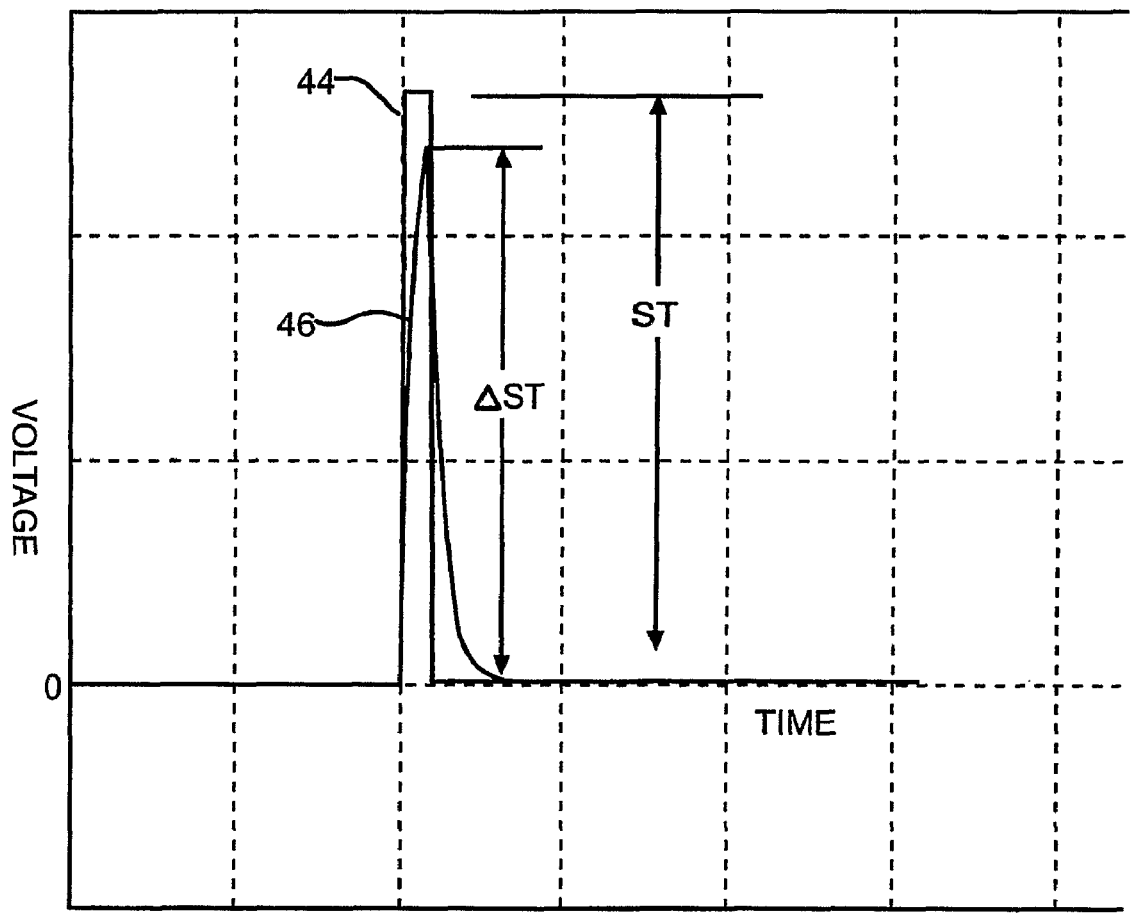
FIG. 3 is an enlarged portion of the graph shown in FIG. 2 that illustrates the response of the sensor to the test signal.

An enlarged view of the test pulse 44 and response 46 is illustrated in FIG. 3, where ST is the magnitude of the test pulse 44 and ΔST is the magnitude of the test pulse response 46. As shown in FIG. 3, the resulting response voltage 46 of ΔST and is less than the voltage ST of the test pulse 44. The invention contemplates measuring the magnitude of the sensor response 46 after a predetermined time period passes following the application of the test pulse 44. In the preferred embodiment, a one millisecond delay is utilized; however, the invention also may be practiced with other time delays.

Returning to FIG. 2, the invention also contemplates that the test pulse 44 is periodically injected into the sensor 10. As also shown in FIG. 2, the period for injecting the test pulses 44 is greater than the period for the sampled sensor output signals 42. By selecting the sensor output signal sampling period to be large enough relative to the test signal injection period, and the test pulse duration to be relatively short, the transient effect of the test pulse 44 is ended by time that the next sensor output signal 42 is generated. Thus, the test circuit 16 effectively "steps over" the signals generated by the testing of the sensor 10 and produces the output signals 42 shown in FIG. 2 that are supplied to the individual vehicle system control ECU's. Because the test pulse 44 and its corresponding response 46 have no effect upon the sensor output signal 42, the sensor may be tested while the vehicle is being operated, thus improving the reliability of the vehicle control systems by assuring proper operation of the sensors.

As described above, the ASIC 16 may also average the analog signal 40 between sampling times to determine the sensor output signal 42 that is provided to the test circuit 16. When this is the case, the invention contemplates either ignoring the sensor signal while the test pulse 44 and the test pulse response 46 are present, or, alternately, using the sensor output value that is present immediately prior to injection of the test pulse 44 for the values of the sensor signal while the test is in progress.

While the preferred embodiment has been illustrated in FIG. 2 with a test pulse 44 consisting a plurality of positive test pulses, it will be appreciated that the invention also may be practiced with a test signal consisting of a plurality of negative test pulses (not shown), or alternating positive and negative pulses (not shown). Also, the timing of the test pulses 44 as shown in FIG. 2 is meant to be exemplary. The invention may be practiced with a shorter or longer time period separating the test pulses 44. With regard to shorter time periods, the test pulse may be optionally injected between each of the sensor output signals 42, if so desired.

Figure 4:
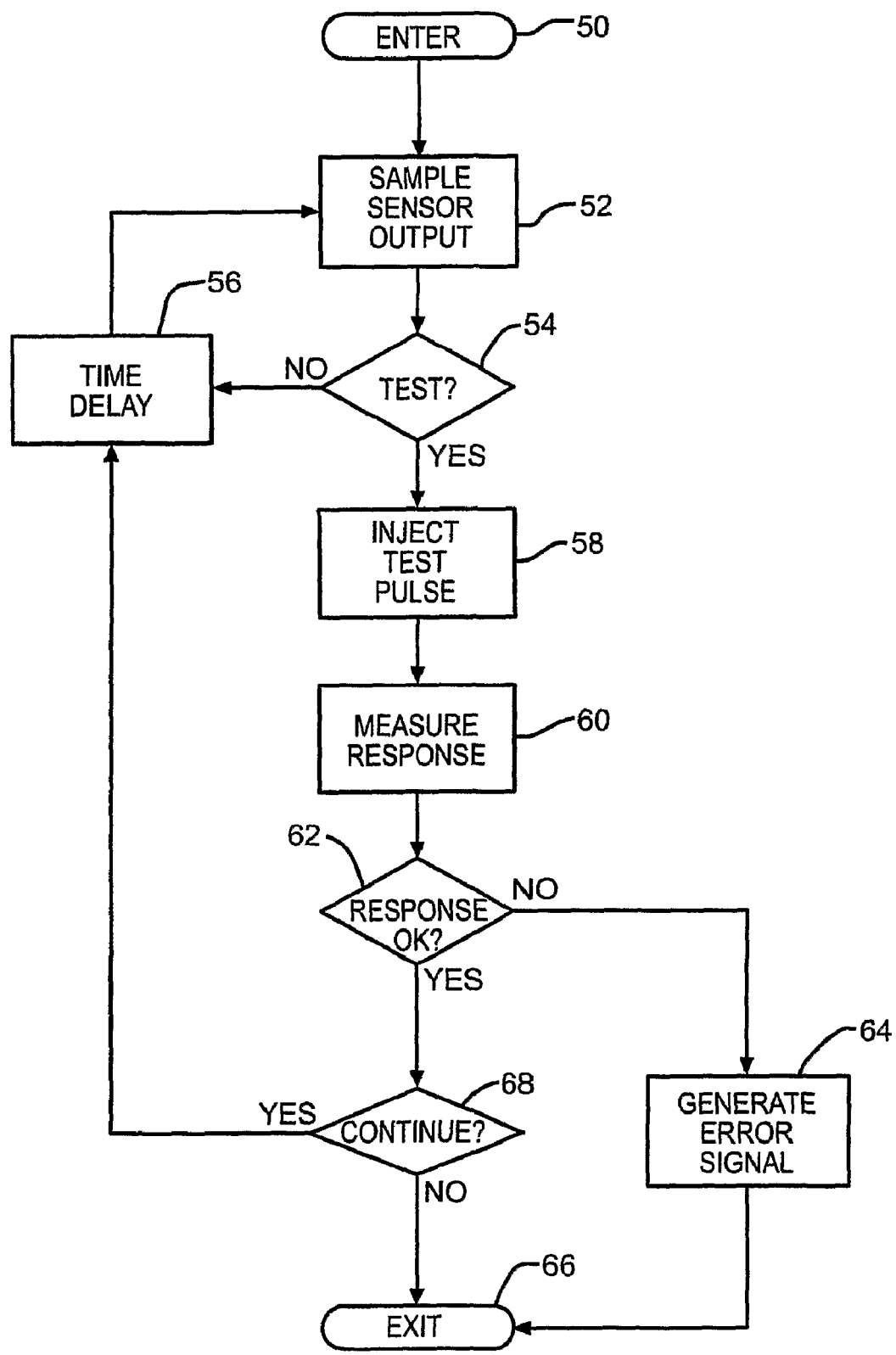
FIG. 4 is a flow chart for the operation of the sensor shown in FIG. 1.

The invention also contemplates that the test circuit 16 includes a microprocessor (not shown) that controls the operation of the testing of the sensor in accordance with a stored algorithm. A flow chart showing the basic operation of the algorithm is illustrated in FIG. 4. The flow chart is entered through block 50 and proceeds to functional block 52 where the output of the sensor is sampled to generate the output signal 42 shown in FIG. 2. The algorithm then advances to decision block 54 where it is determined whether it is time to inject a test pulse into the sensor. The determination to inject a test pulse is provided by a conventional method, such as checking a counter. If it is not time to inject a test pulse, the algorithm transfers to functional block 56 for an iteration time delay and then returns to functional block 52 to again sample the sensor output.

If, in decision block 54, the algorithm determines that it is time to generate a test pulse, the algorithm transfers to functional block 58 where a test pulse 44 is injected into the sensor 10. The timing, or delay from the last sampled signal 42, for the injection of the test pulse 44 would also be determined in functional block 58. The algorithm then continues to functional block 60 where the response signal 46 is measured. The algorithm then advances to decision block 62.

In decision block 62, the algorithm determines whether the response signal 46 measured in functional block 60 is satisfactory. Several methods are contemplated for determining this. For example, the response may be compared to a predetermined threshold that is stored in the ASIC 14. If the response is less than the stored threshold, the response is not satisfactory and the algorithm transfers to functional block 64 where an error signal is generated, or, alternately, an error flag is set. The algorithm then exits through block 66. If, in decision block 62, the response is greater than or equal to the threshold, the algorithm transfers to decision block 68.

In decision block 68, the algorithm determines whether or not it should continue by checking criteria for continued running, such as, for example, the vehicle engine is running or the vehicle is in motion. If it is determined to continue to run the algorithm, the algorithm proceeds with its next iteration by transferring to functional block 56 for the next time delay. If it is determined in decision block 68 to not continue to run the algorithm, the algorithm exits through block 66.

While the algorithm has been described as comparing the signal response to a threshold in decision block 62, it will be appreciated that the decision may also be made by applying other criteria. For example, the response may be compared to a pair of upper and lower threshold values in decision block 62. Only if the response is between the two threshold values will the algorithm continue to decision block 68. Otherwise, the algorithm will transfer to functional block 64 where the error signal is generated.

The algorithm described above and illustrated in FIG. 4 will generate an error signal upon the occurrence of a single fault. In order to avoid generating a false error signal, it may be desirable that the fault condition continue for a time period or be repeated for a predetermined number of times. An embodiment of the present invention that includes such criteria is illustrated by the flow chart shown in FIG. 5, where blocks that are the same as shown in FIG. 4 have the same numerical identifiers. As will be described below, the algorithm shown in FIG. 5 detects a number of consecutive faults before generating an error signal, which also is equivalent to having a fault condition continue for a time period.

The operation of the algorithm shown in FIG. 5 will now be described. After entering the flow chart through block 50, the algorithm advances to functional block 70, where a Fault Counter FC is set to zero. The algorithm then continues as described above and illustrated in FIG. 4 to decision block 62 where it is determined whether or not the response to the injected test signal is satisfactory. If it is determined that the response to the test signal is satisfactory, the algorithm transfers to decision block 68 where it is determined whether not the algorithm should continue to run and then continues as described above. If, in decision block 62, it is determined that the response is not satisfactory, the algorithm transfers to functional block 72 where the Fault Counter FC is incremented by one. The algorithm then continues to decision block 74.

In decision block 74, the Fault Counter FC is compared to a predetermined Fault Counter Threshold $FC_{MAX}$. If the value of the Fault Counter FC is less than $FC_{MAX}$, the algorithm transfers to decision block 76 where it is determined whether not the algorithm should continue to run. If, however, in decision block 74, the value of the Fault Counter FC is greater than or equal to $FC_{MAX}$, the algorithm transfers to functional block 64 where an error signal is generated, or, alternately, an error flag is set. The algorithm then exits through block 66.

Returning to decision block 76, if it is determined that the algorithm should continue to run, the algorithm transfers to functional block 56 for a time delay before continuing with the next iteration of sampling the sensor output signal. If it is determined in decision block 76 that the algorithm should not continue to run, the algorithm exits through block 66.

Figure 5:
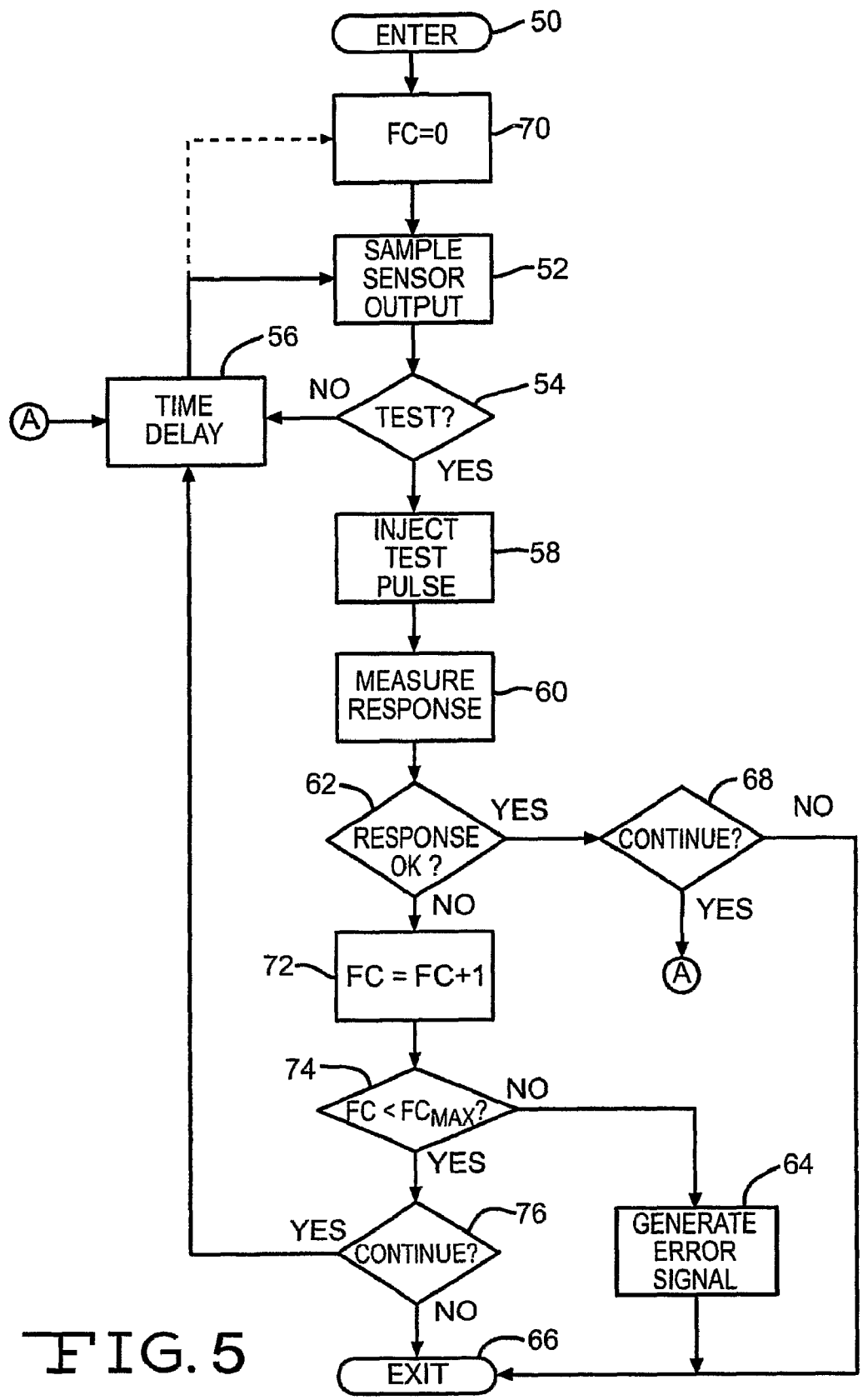
FIG. 5 is an alternate embodiment of the flow chart shown in FIG. 3.

As illustrated in FIG. 5, the algorithm will continue to count faults until $FC_{MAX}$ is reached, at which time an error signal is generated. However, the faults may not occur consecutively. The invention also may be practiced with an error signal being generated as a result of counting consecutive faults. This accomplished by resetting the Fault Counter FC to zero after each successful response is detected in decision block 60. One method of resetting the Fault Counter FC would be to have the algorithm proceed from the time delay functional block 56 to the Fault Counter FC reset functional block 70 as shown by the dashed line labeled 78 in the upper left corner of FIG. 5.

Figure 6:
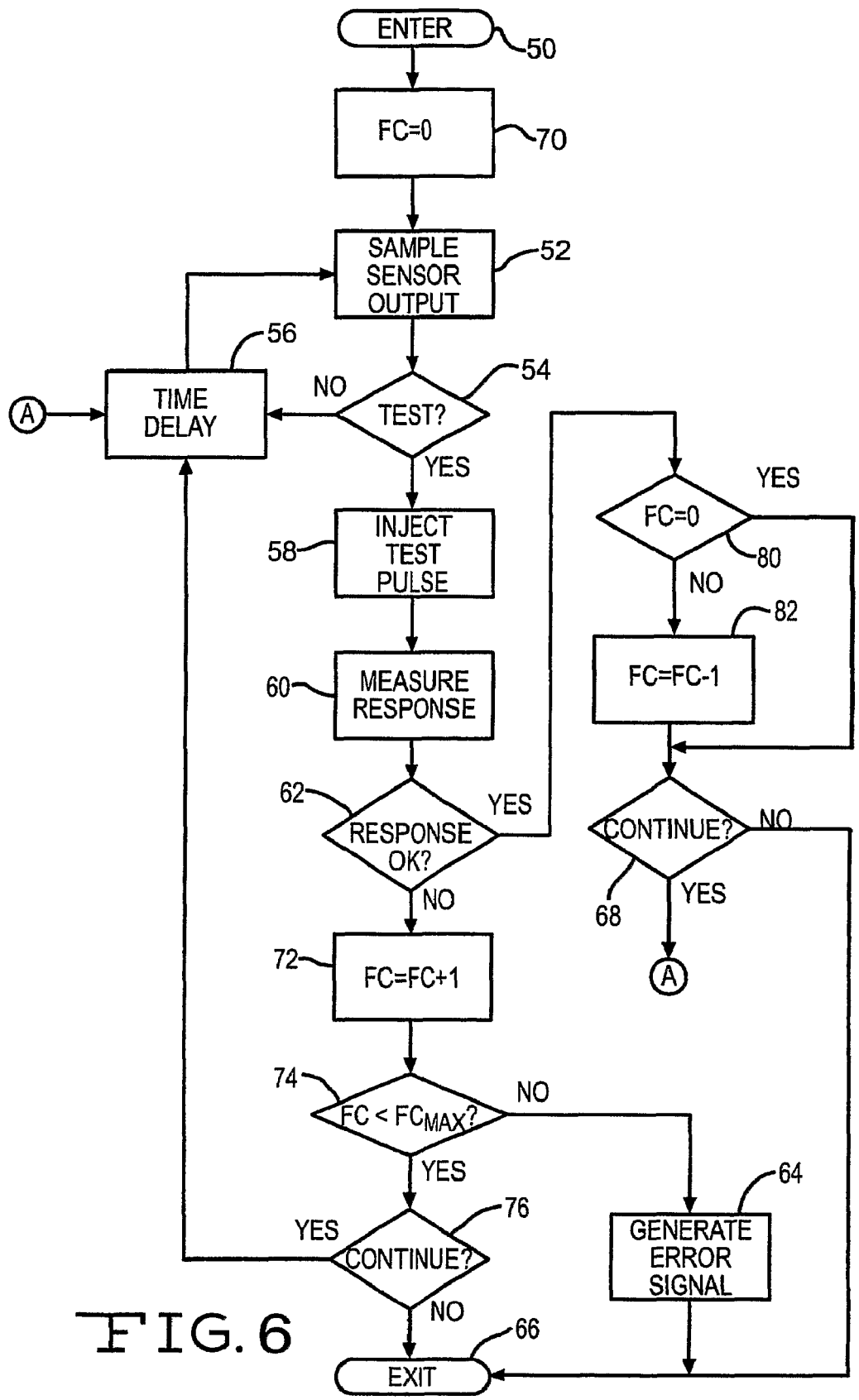
FIG. 6 is another alternate embodiment of the flow chart shown in FIG. 3.

The present invention also contemplates another alternate embodiment of the algorithm in which the Fault Counter FC is incremented for each unsatisfactory response to a test pulse while also being decremented for each satisfactory response. The alternate embodiment is illustrated in FIG. 6 where blocks that are the same as shown in FIGS. 4 and 5 have the same numerical identifiers. As shown in FIG. 6, the algorithm differs from the algorithm shown in FIG. 5 in one of the responses to decision block 62. Upon determining, in decision block 62, that the measured response to the test pulse is satisfactory, the algorithm transfers to decision block 80. In decision block 80, the algorithm checks the value of the Fault Counter FC. If the Fault Counter FC is zero, the algorithm transfers to decision block 68 and continues as described above. If, in decision block 80, the Fault Counter FC is not zero, the counter has been previously incremented by detection of a fault. However, in the current iteration, a fault was not detected. Accordingly, the algorithm transfers to decision block 82 where the Fault Counter FC is decremented by one. The algorithm then proceeds to decision block 68 and continues as described above. Thus, the algorithm counts up each time a fault and detected, but counts down upon detection of a satisfactory response to the test pulse. An error signal is only generated upon the Fault Counter FC reaching the Fault Counter Threshold $FC_{MAX}$.

It will be appreciated that the flow charts described above and illustrated in FIGS. 4 through 6 are intended to be exemplary and that the invention also may be practiced with algorithms having flow charts that differ from the ones shown here.

As described above, the response voltage $\Delta ST$ may be compared by the test circuit 16 to minimum and maximum thresholds values that are stored in a Non-Volatile Random Access Memory (NVRAM) and the sensor is deemed to operating satisfactorily only if the response voltage $\Delta ST$ falls within the range defined by the thresholds. As shown in the flow charts, following measurement of the sensor response voltage, the algorithm reaches decision block 62, where the response voltage $\Delta ST1$ to the positive test signal pulse ST1 is compared to allowed maximum and minimum values in accordance with the following relationship:

Is $T_{MAX} \geq \Delta ST1 \geq T_{MIN}$?, where, $T_{MAX}$ is the upper limit for the allowable output voltage range and $T_{MIN}$ is the lower limit for the allowable output voltage range.

The present invention also contemplates that the test fault thresholds may be temperature and noise compensated. Thus, a nominal value for each of the self test response voltages $\Delta ST_x$ as a function of temperature T is given by the following formula:

$$\Delta ST_{x\ nominal\ deg/s}(T) = \Delta ST_{x\ nominal\ volt}(T)/K(T);\ \text{where,}$$

$$\Delta ST_{x\ nominal\ volt}(T) = \Delta ST_x + a\_\Delta ST_x*[0.0084*(25-T)] + b\_\Delta ST_x*[0.0084*(25-T)]^2\ \text{and}$$

$$K(T) = \text{Sens} + a\_\text{Sens}*[0.0084*(25-T)] + b\_\text{Sens}*[0.0084*(25-T)]^2,$$

with x=1 or 2 and $\Delta ST1$, $a\_\Delta ST1$, $b\_\Delta ST1$, $\Delta ST2$, $a\_\Delta ST2$, $b\_\Delta ST2$, Sens, a_Sens and b_Sens being values that are stored in a Non-Volatile Random Access Memory (NVRAM).

The self test error fault thresholds then be based upon gain and offset sensitivity for $\Delta ST_{x\ nominal\ deg/s}$ (T) in accordance with the following formulas:

$$T_{MAX} = HW\_FILTER\_COEFFICIENT\_HIGH*\Delta ST_{x\ nominal\ deg/s}(T) + \text{threshold value calculated above,}$$

and $$T_{MIN} = HW\_FILTER\_COEFFICIENT\_LOW*\Delta ST_{x\ nominal\ deg/s}(T) - \text{threshold value calculated above.}$$

The above threshold bound calculations would be carried out before comparing the test response voltage $\Delta ST_x$ to the thresholds in decision block 62 in the flow charts. Thus, the calculation for the $\Delta ST1$ and $\Delta ST2$ bounds may be completed during the measurement of the first response voltage in functional block 60. With regard to the embodiment utilizing a single threshold, the invention contemplates that $T_{MAX}$ may optionally be utilized for the threshold.

The invention also contemplates four additional embodiments that provide a capability to ignore response voltages caused by external actions, such as, for example, power supply spikes and external noise, without resetting the fault counter. Such extraneous signals are identified by monitoring the rise time and/or frequency of the signal.

The first alternate embodiment of the algorithm is described in the following with respect to the flow chart shown in FIG. 5; however, the algorithm also may be applied to the flow chart shown in FIG. 6. The algorithm includes measuring the rate of rise of the response voltage in functional block 60 and comparing the measured rate of rise of the response voltage to a rate of rise threshold in decision block 62. The rate of rise decision is only considered upon the determination in decision block 62 that the voltage response is not within an allowable bound. If, in decision block 62, the response voltage rate of rise is less than or equal to a rate of rise threshold $SR_{MAX}$, the fault counter FC is indexed in functional block 72. If, in decision block 62, the rate of rise is greater than the rate of rise threshold $SR_{MAX}$, the algorithm transfers directly to decision block 68, thereby skipping the indexing of the Fault Counter FC. The use of the first alternate algorithm allows an extraneous signal having too fast of a rise time to be ignored without resetting the fault counter.

The second alternate embodiment of the algorithm includes measuring the frequency of the response voltage in functional block 60 and comparing the measured frequency of the response voltage to a signal frequency threshold in decision block 62. The response voltage frequency decision is only considered upon the determination in decision block 62 that the voltage response is not within an allowable bound. If, in decision block 62, the response voltage frequency is less than or equal to a frequency threshold $SF_{MAX}$, the fault counter FC is indexed in functional block 72. If, in decision block 62, the response voltage frequency is greater than the frequency threshold $SF_{MAX}$, the algorithm transfers directly to decision block 68, thereby skipping the indexing of the Fault Counter FC. The use of the second alternate algorithm allows an extraneous signal having too high of a frequency to be ignored without resetting the fault counter.

The third and fourth alternate embodiments include consideration of both the rate of rise and the frequency of the response voltage with both of the parameters being measured in functional block 60. In the third alternate embodiment, if either the rate of rise threshold $SF_{MAX}$ or the frequency threshold $SF_{MAX}$ is exceeded, the algorithm transfers directly to decision block 68, skipping the indexing of the Fault Counter FC. In the fourth alternate embodiment, only if both the rate of rise threshold $SF_{MAX}$ and the frequency threshold $SF_{MAX}$ are exceeded, the algorithm transfers directly to decision block 68, skipping the indexing of the Fault Counter FC.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for verifying proper operation of sensor comprising the steps of:
    (a) providing a sensor adapted to generate a sensor signal that is representative of a sensed vehicle operating parameter;
    (b) generating a sampled sensor output signal from the sensor signal;
    (c) providing a test signal to the sensor after a first one of two consecutive sampled output signals to induce a test output signal before the occurrence of the second of the two consecutive sampled output signals;
    (d) monitoring the test output signal; and
    (e) comparing the test output signal to a test criteria.

2. The method of claim 1 further including the step of: (f) generating an error signal upon the test signal induced output signal not meeting the test criteria.

3. The method of claim 2 wherein the error signal generated in step (f) comprises setting a fault flag.

4. The method of claim 2 wherein the error signal is generated in step (f) only after the test signal induced output signal has not met the test criteria for a predetermined number of times.

5. The method of claim 1 wherein the test output signal induced in step (c) has a duration such that the test output signal decays before the occurrence of the second of the two consecutive sampled output signals.

6. The method of claim 5 wherein the sensor output signal is sampled periodically.

7. The method of claim 6 wherein the test signal in step (c) is provided periodically.

8. The method of claim 7 wherein the sampling of the sensor output signal in step (b) is at a first rate while the provision of the test signal in step (c) is at a second rate with the second rate being less than the first rate.

9. The method of claim 8 wherein the first rate is an integer multiple of the second rate.

10. The method of claim 7 wherein the period for providing the test signal is greater that the period for sampling the sensor output signal.

11. The method of claim 10 wherein the period for providing the test signal is an integer multiple of the period for sampling the periodic sensor output signal.

12. The method of claim 10 wherein the output test signal is compared to the test signal during step (e).

13. The method of claim 10 wherein, during step (e), the output test signal is compared to the test signal and the difference between the two signals is compared to a threshold.

14. The method of claim 13 further including, subsequent to step (e) setting a fault flag is the difference between the two signals is less than the threshold.

* * * * *